United States Patent [19]
Sasaki et al.

[11] Patent Number: 5,773,133
[45] Date of Patent: Jun. 30, 1998

[54] MAGNETIC RECORDING MEDIUM

[75] Inventors: Yuichi Sasaki; Kazuhiro Okamoto; Kazuo Sasaki; Haruo Ishizaki, all of Miyagi, Japan

[73] Assignee: Sony Corporation, Tokyo, Japan

[21] Appl. No.: 683,210

[22] Filed: Jul. 18, 1996

[30]     Foreign Application Priority Data

Jul. 19, 1995 [JP] Japan .................................. 7-182852

[51] Int. Cl.$^6$ ...................................................... B32B 7/02
[52] U.S. Cl. ........................ 428/216; 428/323; 428/329; 428/336; 428/694 BS; 428/900
[58] Field of Search ..................................... 428/216, 329, 428/336, 694 BS, 900, 323

[56]         References Cited

U.S. PATENT DOCUMENTS 5,587,232  12/1996  Hayashi et al. .......................... 428/323

*Primary Examiner*—Stevan A. Resan
*Attorney, Agent, or Firm*—Hill & Simpson

[57]           ABSTRACT

A magnetic recording medium according to the present invention exhibits not only a good surface property but also a high electromagnetic transduction characteristic. The magnetic recording medium includes a non-magnetic substrate, a lower layer provided on the non-magnetic substrate and composed of a non-magnetic powder and a binder and an upper layer provided on the lower layer and composed of a ferromagnetic powder and a binder, wherein the upper layer has a thickness of not more than 0.5 $\mu$m, and the lower layer contains as said non-magnetic powder an acicular iron oxide powder which has a longer axis length of 0.05 to 0.2 $\mu$m and an aspect ratio of 2 to 10.

8 Claims, 1 Drawing Sheet

MAGNETIC RECORDING MEDIUM

BACKGROUND OF THE INVENTION

1. Field of the Invention

This invention relates to a so-called wet-on-wet coating-type magnetic recording medium, and more particularly to a magnetic recording medium which is improved in electromagnetic transduction characteristics, especially in a short wavelength region.

2. Prior Art

It is known that a so-called wet-on-wet coating type magnetic recording medium is produced by coating a magnetic coating material, which is prepared by dispersing a ferromagnetic powder, a binder and various additives in an organic solvent, on a non-magnetic substrate to form a magnetic layer thereon, and then drying the magnetic layer. In such a wet-on-wet coating type magnetic recording medium, in order to achieve a high densification thereof, there has been used fine metal particles as the afore-mentioned ferromagnetic powder.

The magnetic recording medium in which such fine metal particles is used, has been currently predominately employed in various fields such as audio tapes or video tapes, high-densified floppy discs, recording media for computers, e.g., back-up data cartridges, or the like.

Meanwhile, in order to achieve the high densification of the wet-on-wet coating type magnetic recording medium, it is important to not only smoothen a surface of the magnetic recording medium and minimize a spacing loss but also simultaneously reduce an output loss upon recording demagnetization, while employing the fine metal powder as a ferromagnetic powder.

To meet these requirements, there have been attempted methods such as (1) increase of a coercive force and a saturation magnetization of the ferromagnetic powder, (2) uniform distribution of the coercive force of the ferromagnetic powder, (3) impartment of perpendicular magnetic anisotropy, (4) realization of thinned magnetic layer, or the like.

Among them, the methods (1) and (2) can directly improve the output of the magnetic recording medium. In order to improve such coercive force and saturation magnetization of the magnetic recording medium, studies have been made with respect to elemental composition of the ferromagnetic powder and the like, so that fine metal particles having a coercive force of greater than 160 kA/m and further fine metal particles having a saturation magnetization of 140 $Am^3$/kg have been developed. Incidentally, the distribution of the coercive force is influenced by distribution of a grain size of the ferromagnetic powder. Consequently, by attaining uniformity of a grain size of the ferromagnetic powder, the distribution of the coercive force thereof has been considerably improved.

The method (3) of imparting a perpendicular magnetic anisotropy is directed to achievement of a high densification by a perpendicular magnetic recording. In this regard, in the case of the wet-on-wet coating-type magnetic recording medium, the perpendicular anisotropy is largely influenced by controlling the magnetic orientation of the ferromagnetic powder. For example, when acicular particles are employed as the ferromagnetic powder, attempts have been made to subject the magnetic coating layer to a perpendicular magnetic orientation treatment or an oblique magnetic orientation treatment. However, these treatments have not yet been put into practical use because of difficulty in controlling the magnetic orientation, non-uniform surface of the magnetic coating layer caused by the magnetic orientation, or the like.

Furthermore, the method (4) of thinning the magnetic layer is considered to be extremely useful for reducing a self-demagnetization loss. In this case, if a thickness of the magnetic layer is simply reduced to 1 μm or less, a shape of a surface of the underlying non-magnetic substrate is apt to influence a shape of an outer surface of the magnetic layer, so that a smooth surface of the magnetic layer is difficult to produce. Under this circumstance, in the event that the thickness of the magnetic layer is reduced, there has been often adopted such a wet-on-wet coating structure that an intermediate non-magnetic layer is interposed between the non-magnetic substrate and the magnetic layer. By providing such an intermediate non-magnetic layer, the outer surface of the magnetic layer can be prevented from being adversely affected by the shape of the surface of the underlying non-magnetic substrate because some spacing is created between the non-magnetic substrate and the magnetic layer. Accordingly, the magnetic layer can be formed with not only a small thickness but also a smooth surface.

The afore-mentioned non-magnetic layer and the magnetic layer can be suitably produced according to a wet-on-wet coating method by which the two layers are simultaneously coated on the non-magnetic substrate, for example, by using an extruder equipped with four lip-type die head in which two slits are provided to extrude a non-magnetic coating material and a magnetic coating material, respectively. The wet-on-wet coating method can provide a coating layer having a good surface shape without coating deficiencies such as scores. In addition, the lower and upper layers are strongly bonded together and therefore exhibit a high durability.

However, while a surface property of the afore-mentioned magnetic recording medium produced according to the wet-on-wet coating method is high enough to be applied to the existing video recorder or computers, such a magnetic recording medium cannot provide an excellent electromagnetic transduction characteristic as high as being applicable to apparatuses which have been further improved in high-densification.

OBJECT AND SUMMARY OF THE INVENTION

It is therefore an object of the present invention to provide a magnetic recording medium capable of exhibiting not only a good surface property but also a good electromagnetic transduction characteristic even when it is highly densified.

In an aspect of the present invention, there is provided a magnetic recording medium including a non-magnetic substrate, a lower layer provided on the non-magnetic substrate and composed of a non-magnetic powder and a binder and an upper layer provided on the lower layer and composed of a ferromagnetic powder and a binder, wherein the upper layer has a thickness of not more than 0.5 μm, and the lower layer contains as the non-magnetic powder an acicular iron oxide powder which has a longer axis length of 0.05 to 0.2 μm and an aspect ratio of 2 to 10.

By the afore-mentioned arrangement of the magnetic recording medium, when the thickness of the upper layer is reduced to 0.5 μm or less, the recording demagnetization can be reduced so that the output therefrom can be highly improved. When the acicular iron oxide powder having a longer axis length of 0.05 to 0.2 μm is used as the non-magnetic powder contained in the lower layer, the surface property of the lower layer is highly improved, which results in improvement in a surface property of the upper layer coated over the lower layer. As a result, electromagnetic characteristics thereof, especially outputs in a short wavelength region or overwriting characteristic, can be also improved. Further, the use of the acicular iron oxide powder can impart a high strength to the magnetic layer due to its net-work structure formed by the intertwined acicular powder, and enhance a traveling ability of the magnetic recording medium.

Further, when a ratio of a longer axis length to a shorter axis length (hereinafter referred to merely as an "aspect ratio") of the acicular iron oxide powder having an longer axis length of 0.05 to 0.2 µm is limited to the range of 2 to 10, a surface property of the lower layer is highly improved.

Furthermore, the lower layer contains carbon black having an average particle size of 0.01 to 0.04 µm in such an amount that a volume ratio of the acicular iron oxide powder to the carbon black is in the range of 70:30 to 100:0. The use of the carbon black can impart an adequate conductivity to the magnetic recording medium, so that generation of electrostatic charge is effectively prevented when the magnetic recording medium is brought into slide contact with various sliding members. As a result, the magnetic recording medium is highly improved in its traveling durability.

These and other objects, features and advantages of the present invention will become more apparently from the following detailed description when read in conjunction with the accompanying drawings and the appended claims.

DETAILED DESCRIPTION OF THE INVENTION

Figure 1:
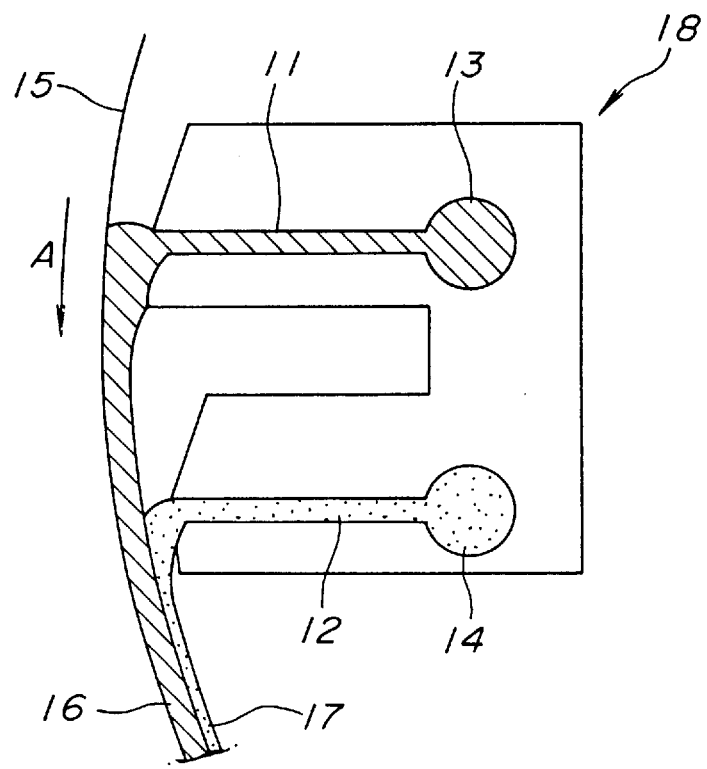
FIG. 1 is a schematic view showing a coating appratus applicable for forming upper and lower layers of a magnetic recording medium according to the present invention.

The present invention is described in detail below.

The magnetic recording medium according to the present invention has a so-called wet-on-wet coating type arrangement in which a lower non-magnetic layer composed of a binder and a non-magnetic powder dispersed in the binder, and an upper magnetic layer composed of a binder and a ferromagnetic powder dispersed in the binder, are formed on a non-magnetic substrate.

In the production of such a wet-on-wet coating type magnetic recording medium, a lower layer coating material and an upper layer coating material can be first prepared by dispersing lower and upper coating compositions in an organic solvent, respectively. The thus-prepared lower and upper layer coating materials may be coated on the non-magnetic substrate and then dried to form the lower non-magnetic layer and the upper magnetic layer.

In such a wet-on-wet coating type magnetic recording medium, a thickness of the upper magnetic layer is limited to 0.5 µm or less, while an acicular iron oxide powder having a longer axis length of 0.05 to 0.2 µm is used as the non-magnetic powder contained in the lower non-magnetic layer.

Thus, when the thickness of the upper magnetic layer is limited to 0.5 µm or less, recording demagnetization of the resultant magnetic recording medium is reduced so that the output thereof is enhanced.

However, in the case where the thickness of the magnetic layer is reduced, a surface shape thereof is apt to be influenced by the shape of a surface of the underlying layer. For this reason, if the underlying layer has a coarse surface, there occurs deterioration of a surface property of the magnetic layer, so that electromagnetic transduction characteristics are considerably deteriorated.

In view of the afore-mentioned problems, in the magnetic recording medium according to the present invention, the thickness of the upper magnetic layer is limited to 0.5 µm or less and simultaneously the acicular iron oxide powder having a longer axis length of 0.05 to 0.2 µm is used as the non-magnetic powder contained in the lower non-magnetic layer.

If the acicular iron oxide powder used has a longer axis length of less than 0.05 µm, dispersibility thereof in the coating material becomes poor, so that the resultant coating layer has a coarse surface. Conversely, if the acicular iron oxide powder used has the longer axis length of more than 0.2 µm, such a powder is readily dispersed in the coating material. However, in such a case, the acicular iron oxide powder is present in non-oriented state in the resultant coating layer, so that the acicular iron oxide particles having a larger length are exposed to an outer surface of the coating layer, whereby the surface property of the coating layer is deteriorated. Thus, whenever the acicular iron oxide powder used is out of the range of 0.05 to 0.2 µm, the electromagnetic transduction characteristics are deteriorated due to generation of spacing loss.

On the other hand, in accordance with the present invention, since the acicular iron oxide powder used has a longer axis length ranging from 0.05 to 0.2 µm, a good dispersibility of the powder in the coating material can be maintained and the exposure of the powder to the outer surface of the coating layer can be effectively prevented. Accordingly, the use of the acicular iron oxide powder having the longer axis length of such a particular range can improve a surface property of the lower non-magnetic layer so that a surface property of the overlying upper magnetic layer can be also improved. As a result, the electromagnetic transduction characteristics, especially the outputs and overwriting characteristic in a short wavelength region, can be considerably enhanced. In addition, since such an acicular iron oxide powder provides an intertwined structure in which the acicular iron oxide particles are mutually entangled, the resultant coating layer can exhibit a high strength and an improved traveling durability.

Meanwhile, in order to impart a high surface property to the magnetic recording medium, it is preferred that the acicular iron oxide powder has an aspect ratio ranging from 2 to 10 in addition to the longer axis length ranging from 0.05 to 0.2 µm. further, the acicular iron oxide surface has a specific surface area of 5 to 100 $m^2/g$, preferably 20 to 70 $m^2/g$.

Specific examples of the acicular iron oxide powder may include $\alpha$-$Fe_2O_3$ powder, a goethite, or the like. These powders may be used singly or in the form of a mixture of two or more thereof. In addition, the acicular iron oxide powder may be doped with an adequate amount of impurities or treated with an adequate compound containing Al, Si, Ti, Sn, Sb, Zr or the like element to improve dispersibility, conductivity or color tone, thereof.

Further, if carbon black is added to the lower non-magnetic layer, the resultant magnetic recording medium can exhibit an adequate conductivity, so that generation of an electrostatic charge can be effectively prevented even when it is brought into slide contact with various slide members. In this case, upon the incorporation of the carbon black in the lower non-magnetic layer, it is preferred that the volume ratio of the acicular iron oxide powder to the carbon black is in the range of 70:30 to 100:0. If the volume ratio of the acicular iron oxide powder to the carbon black is less than 70:30, a surface smoothness of the lower non-magnetic layer and therefore the upper magnetic layer is deteriorated.

Incidentally, the carbon black has preferably a specific surface area of 100 to 400 $m^2/g$, an oil absorption for dibutyl phthalate (DBP) of 20 to 200 ml/100 g.

Specific examples of such a carbon black may include furnace black for rubber, pyrolytic carbon, carbon black for colorants, acetylene black, or the like. These carbon blacks may be used singly or in the form of a mixture of two or more thereof.

As described above, in accordance with the present invention, the thickness of the upper magnetic layer and the shape of the acicular iron oxide powder contained in the lower non-magnetic layer are adjusted to limited range or shape. On the other hand, any materials which are normally used in such a wet-on-wet coating type magnetic recording medium, are applicable respectively as the binder of the lower non-magnetic layer and as the ferromagnetic powder and the binder of the upper magnetic layer.

The binder of the lower non-magnetic layer may be those used for conventional magnetic recording media. Examples of the suitable binders for the lower non-magnetic layer, include thermoplastic resins, thermosetting resins, reactive-type resins, or the like. The particular preferred binders are those having a number-average molecular weight of 5,000 to 100,000.

Specific examples of the thermoplastic resins may include vinyl chloride, vinyl acetate, a vinyl chloride-vinyl acetate copolymer, a vinyl chloride-vinylidene chloride copolymer, a vinyl chloride-acrylonitrile copolymer, an acrylic ester-acrylonitrile copolymer, an acrylic ester-vinyl chloride-vinylidene chloride copolymer, an acrylic ester-vinylidene chloride copolymer, a methacrylic ester-vinylidene chloride copolymer, a methacrylic ester-vinyl chloride copolymer, a methacrylic ester-ethylene copolymer, polyvinyl fluoride, a vinylidene chloride-acrylonitrile copolymer, an acrylonitrile-butadiene copolymer, polyamide resins, polyvinyl butyral, cellulose derivatives such as cellulose acetate butyrate, cellulose diacetate, cellulose triacetate, cellulose propionate or nitro-cellulose, a styrene-butadiene copolymer, polyurethane resins, polyester resins, amino resins, synthetic rubbers, or the like.

Specific examples of the suitable thermosetting or reactive-type resins may include phenol resins, epoxy resins, polyurethane curable resins, urea resins, melamine resins, alkyd resins, silicone resins, polyamine resins, urea-formaldehyde resins, or the like.

These binders may be used singly or in the form of a mixture of two or more thereof.

In order to improve dispersibility of the powder components, various polar functional groups can be introduced into the binder. Examples of the suitable polar functional groups introduced into the binder, may include —$SO_3M$, —$OSO_3M$, —COOM, —P=$O(OM)_2$ where M is a hydrogen atom or an alkali metal selected from lithium, potassium, sodium and the like, branched chain amines such as —$NR_1R_2$ or —$NR_1R_2,R_3$ $^+X^-$ or primary chain amines such as >$NR_1R_2^+X^-$ where $R_1$, $R_2$ and $R_3$ are independently a hydrogen atom or a hydrocarbon group, and X is an inorganic ion, e.g., a halogen ion such as fluorine, chlorine, bromine or iodine, or an organic ion, —OH, —SH, —CN, an epoxy group or the like. The amount of the polar functional group introduced into the binder is preferably in the range of $10^{-1}$ to $10^{-8}$ mol/g, more preferably $10^{-2}$ to $10^{-6}$ mol/g.

The binder may be contained in the lower non-magnetic layer in an amount of 1 to 200 parts by weight, preferably 10 to 50 parts by weight, based on 100 parts by weight of the non-magnetic powder. If the amount of the binder is too large, the content of the non-magnetic powder in the lower non-magnetic layer becomes relatively low so that the effect of the non-magnetic powder cannot be sufficiently exhibited. Conversely, if the amount of the binder is too small, a mechanical strength of the coating layer as a whole is deteriorated and further the non-magnetic powder cannot be uniformly dispersed therein, which results in deterioration of the surface property of the coating layer.

Also, these binders can be cured by using a polyisocyanate-based cross-linking agent. Examples of the suitable polyisocyanate-based cross-linking agents may include toluene-diisocyanate or adducts thereof, alkylene-diisocyanate or adducts thereof, or the like. The amount of the polyisocyanate-based cross-linking agent blended is in the range of 5 to 80 parts by weight, preferably 10 to 50 parts by weight, based on 100 parts by weight of the binder.

On the other hand, the upper magnetic layer is composed mainly of a ferromagnetic powder and a binder.

Specific examples of the ferromagnetic powders may include metal such as Fe, Co or Ni, an alloy such as Fe—Co, Fe—Ni, Fe—Al, Fe—Ni—Al, Fe—Al—P, Fe—Ni—Si—Al, Fe—Ni—Si—Al—Mn, Fe—Mn—Zn, Fe—Ni—Zn, Co—Ni, Co—P, Fe—Co—Ni, Fe—Co—Ni—Cr, Fe—Co—Ni—P, Fe—Co—B, Fe—Co—Cr—B, Mn—Bi, Mn—Al or Fe—Co—V, iron nitride, iron carbide, or the like. In order to prevent sintering upon reduction and maintain a shape of the upper magnetic layer, the ferromagnetic powder may contain an adequate amount of light metal such as Al, Si, P or B.

Further examples of the ferromagnetic powder suitably used in the present invention may include $\gamma$-$Fe_2O_3$, $Fe_3O_4$, a berthollide compound of $\gamma$-$Fe_2O_3$ and $Fe_3O_4$, cobalt-containing $\gamma$-$Fe_2O_3$, cobalt-containing $Fe_3O_4$, a berthollide compound of the cobalt-containing $\gamma$-$Fe_2O_3$ and the cobalt-containing $Fe_3O_4$, or oxides composed of $CrO_2$ and at least one metal element, for example, selected form Te, Sb, Fe, B and so on. Furthermore, hexagonal system plate-like ferrite, M-type, W-type, Y-type or Z-type ferrite or lead ferrite may be suitably used in the present invention. In order to control the coercive force, these ferrite may contain Co—Ti, Co—Ti—Zn, Co—Ti—Nb, Co—Ti—Zn—Nb, Cu—Zr, Ni—Ti or the like.

The afore-mentioned ferromagnetic powder may be used singly or in the form of a mixture of two or more thereof.

Meanwhile, it is preferred that the ferromagnetic powder has a specific surface area of 20 to 90 $m^2/g$, preferably 25 to 70 $m^2/g$. If the specific surface area of the ferromagnetic powder used is in the afore-mentioned range, a noise of the resultant magnetic recording medium is reduced due to its adequate fineness, whereby a magnetic material suitable for highly densified recording can be obtained.

When an acicular magnetic powder is used as the ferromagnetic powder, it is preferred that a longer axis length thereof is in the range 0.05 to 0.50 $\mu$m and an aspect ratio thereof is in the range of 3 to 15. If the longer axis length is less than 0.05 $\mu$m, the magnetic powder is difficult to disperse in the magnetic coating material. Conversely, if the longer axis length exceeds 0.50 $\mu$m, there is a possibility that the noise thereof is caused to be increased. In addition, when the aspect ratio thereof is less than 3, orientation of the ferromagnetic powder is deteriorated so that the output of the magnetic recording medium is decreased. Conversely, if the aspect ratio exceeds 15, the output of short wavelength signals is likely to be decreased.

On the other hand, when the ferromagnetic powder used is plate-like ferrite, it is preferred that the plate diameter thereof is in the range of 0.01 $\mu$m to 0.5 $\mu$m and the thickness thereof is in the range of 0.001 $\mu$m to 0.2 $\mu$m.

Incidentally, configuration parameters of these ferromagnetic powders including the afore-mentioned longer axis length, aspect ratio, plate diameter and plate thickness are average values of 100 or more samples randomly selected from powders in a photograph of a transmission-type electron microscope.

The binder used in the upper magnetic layer together with the ferromagnetic powder, may be any of the above-mentioned binders enumerated for the lower non-magnetic layer. The amount of the binder contained in the upper magnetic layer is the same as that of the lower non-magnetic layer, namely in the range of 1 to 200 parts by weight, preferably 10 to 50 parts by weight, based on 100 parts by weight of the ferromagnetic powder. If the amount of the binder is too large, the content of the ferromagnetic powder in the upper magnetic layer becomes relatively low so that the output of the resultant magnetic recording medium is deteriorated. Conversely, if the amount of the binder is too small, a mechanical strength of the coating layer as a whole is deteriorated and a traveling durability of the resultant magnetic recording medium becomes low. Further, the ferromagnetic powder cannot be uniformly dispersed in the upper magnetic layer, which causes deterioration in output of the magnetic recording medium.

Similarly, the binder contained in the upper magnetic layer can be cured by using a polyisocyanate-based cross-linking agent. The cross-linking agent can be contained in either or both of the lower and upper layers. Further, in the event that the cross-linking agent is contained in both the lower and upper layers, the amounts of the cross-linking agent in the respective layers may be the same or different.

As described above, the lower non-magnetic layer and the upper magnetic layer are composed essentially of the combination of the non-magnetic powder and the binder, and the combination of the ferromagnetic powder and the binder, respectively. Further, other additives such as lubricants, non-magnetic reinforcing particles, surfactants or the like can be added to the respective layers, if desired.

Examples of the suitable lubricants may include solid lubricants such as graphite, molybdenum disulfide or tungsten disulfide, a silicone oil, aliphatic acids having 10 to 22 carbon atoms, aliphatic acid esters synthesized from aliphatic acid having 10 to 22 carbon atoms and alcohol having 2 to 26 carbon atoms, terpene compounds and oligomers thereof, or the like. These lubricants can be added to only the upper magnetic layer, or both of the upper and lower layers.

Examples of the suitable non-magnetic reinforcing particles may include α-, β- or γ-aluminum oxide, chromium oxide, silicon carbide, diamond, garnet, emery, boron nitride, titanium carbide, silicon carbide, rutile-type or anatase-type titanium oxide, or the like. These non-magnetic reinforcing particles have a Mohrs hardness of not less than 5, preferably not less than 6, a specific gravity of 2 to 6, preferably 3 to 5, and an average particle size of not more than 1.0 $\mu$m, preferably not more than 0.5 $\mu$m. The average particle size can be determined from an average value of 100 or more samples randomly selected from a photograph of a transmission-type electron microscope. These non-magnetic reinforcing particles are not added to the lower non-magnetic layer but added to only the upper magnetic layer, if desired. The amount of the non-magnetic reinforcing particles added to the upper magnetic layer is suitably not more than 20 parts by weight, preferably 10 parts by weight, based on 100 parts by weight of the ferromagnetic powder.

The surfactants usable in the present invention may be of a nonionic type, an anionic type, a cation type or an ampholytic type. These surfactants can be added to either or both of the upper and lower layers. In the event that the surfactants are added to both the upper and lower layers, the kinds of the surfactants may be the same or different. The amounts of the surfactants added to the upper and lower layers may be the same or different.

In the production of the upper and lower layers, each composition therefor is first dispersed in an organic solvent to prepare a coating material. The thus-prepared coating materials are in turn coated on a non-magnetic substrate and then dried. Further, the thus-formed magnetic recording medium is subjected to a calendar treatment such that a surface of the upper magnetic layer is smoothened.

Examples of the organic solvents used for preparing the coating materials for the upper and lower layers may include ketone-based solvents such as acetone, methyl ethyl ketone, methyl isobutyl ketone or cyclohexanone, alcohol-based solvents such as methanol, ethanol or propanol, ester-based solvents such as methyl acetate, ethyl acetate, butyl acetate, propyl acetate, ethyl lactate or ethylene glycol acetate, ether-based solvents such as diethylene glycol dimethyl ether, 2-ethoxy ethanol, tetrahydrofuran or dioxane, aromatic hydrocarbon-based solvents such as benzene, toluene or xylene, halogenated hydrocarbon-based solvents such as methylene chloride, ethylene chloride, carbon tetrachloride, chloroform or chlorobenzene.

The compositions for the upper and lower layers may be dispersed in the solvent and kneaded together by using apparatuses. Examples of the suitable apparatuses used for such purposes may include a roll mill, a ball mill, a sand mill, an agitator, a kneader, an extruder, a homogenizer, a supersonic dispersion mixer, or the like.

The thus-prepared coating material is coated on the non-magnetic substrate. The non-magnetic substrate may be any material normally used in the conventional magnetic recording medium. Specific examples of the suitable materials for the substrate may include polymers, typically polyolefins such as polyethylene terephthalate or polyethylene-2,6-naphthalate, celluloses such as cellulose triacetate or cellulose diacetate, vinyl-based resins, polyimides or polycarbonates, metal, glass, ceramics, or the like.

The afore-mentioned two types of the coating materials can be coated on the non-magnetic substrate by using the adequate coating method. Examples of the coating methods may include a wet-on-dry coating method as disclosed in Japanese patent application laid-open (Kokai) No. Hei6-236543 in which the upper layer coating material is coated on the lower layer formed by coating and drying the lower layer coating material, or a wet-on-wet coating method in which the upper layer coating material is coated on the lower layer which is still maintained in undried state.

Among these coating methods, the wet-on-wet coating method is preferred. One example of coating devices usable for the wet-on-wet coating methods is illustrated in FIG. 1.

The coating device illustrated in FIG. 1 includes a die head 18 of a four-lip type having two slits 11 and 12 through which the lower and upper layer coating materials are respectively extruded into a tip end thereof. The die head 18 is provided on a back side thereof with two reservoir portions 13 and 14 serving for storing the lower and upper layer coating materials, respectively. The reservoir portions 13 and 14 are communicated with the slits 11 and 12, respectively, so that the coating materials supplied into the reservoir portions are caused to pass through the slits 11 and 12 and then extruded to the tip end of the die head 18. On the other hand, a non-magnetic substrate 15 to be coated is moved along the tip end of the die head 18 in the direction from the slit 11 for the lower layer coating material toward the slit 12 for the upper layer coating material, namely in the direction of an arrow A in FIG. 1.

When the non-magnetic substrate 15 passes through the tip end of the die head, the lower layer coating material is first extruded through the slit 11 thereonto to form a lower coating layer 16. When the non-magnetic substrate is further moved in the direction A and reaches a position beneath the slit 12, the upper layer coating material is extruded through the slit 12 on the lower layer 16 still maintained in a wet state so as to form a upper layer 17. The thus-coated lower and upper layers 16 and 17 are dried and then subjected to a calendar treatment, if necessary, so that a surface of the coating layer can be smoothened.

A three lip-type or two lip-type die head is also usable in place of the afore-mentioned four lip-type die head 18.

In the case where the lower and upper layers are formed by the wet-on-wet coating method, the lower and upper layers have smooth boundary surfaces because these layers are brought into contact with each other while still maintained in a wet state. This leads to a good surface property of the upper layer. As a result, the magnetic recording medium is suitably applied to high-densification recording for which a limited drop-out, a high output and a low noise are required. Further, since the lower and upper layers can be strongly adhered to each other, no separation between the layers is unlikely to occur so that the magnetic recording medium can exhibit an excellent durability.

Meanwhile, when the lower and upper layers are formed by the wet-on-wet coating method, a clear boundary plane or a mutually mixed region having a certain thickness is formed therebetween. In the latter case, a portion below the mutually mixed region (exclusive of the region) is regarded as the lower layer, while a portion above the mutually mixed region (exclusive of the region) is regarded as the upper layer.

Meanwhile, if the lower and upper layers are formed by the wet-on-dry coating method, the formation of the respective layers can be performed by using a normal coating method such as a die head coating method, a gravure roll coating method, a reverse roll coating method or the like. However, in this case, a material for the lower layer must be carefully selected so as to exhibit a sufficient solvent resistance to the upper layer.

The essential construction of the magnetic recording medium according to the present invention is illustrated above. However, as will be appreciated, the present invention is not limited to the particular construction. For example, similarly to a normal magnetic recording medium, the non-magnetic substrate may be provided, on its surface opposite to the lower and upper layers, with a back coating layer to improve a traveling ability and an anti-static property and anti-transfer property. Further, in order to enhance an adherence between the lower layer and the non-magnetic substrate, an undercoating layer can be provided therebetween. The materials for such back-coating or undercoating layer may be those normally used in the preparation of the conventional magnetic recording medium.

EXAMPLES the present invention is described in more detail below by way of examples.

Example 1

Figure 2:
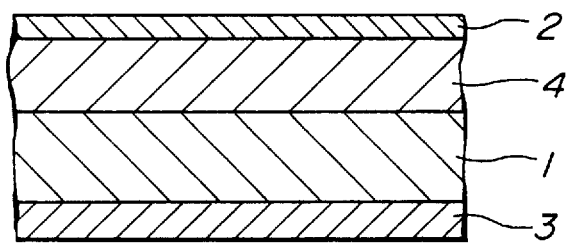
FIG. 2 is a sectional view showing a magnetic recording medium according to the present invention.

A magnetic recording medium as shown in FIG. 2 was prepared in the following manner. The magnetic recording medium prepared in Example 1 includes a non-magnetic substrate 1, a lower layer 4 and an upper layer 2 formed on one surface of the non-magnetic substrate, and a back-coating layer 3 formed on an opposite surface of the non-magnetic substrate.

The below-mentioned composition was weighed and mixed together. Further, the mixture was intimately mixed in a kneader and then dispersed in a sand mill for 4 hours to form an upper layer coating material.

Composition of upper layer coating material:

| | |
|---|---|
| Ferromagnetic powder: Fe-based metal ferromagnetic powder (coercive force: 160 kA/m, saturation magnetization: 135 $Am^2/kg$, specific surface area: 51 $m^2/g$, longer axis length: 0.15 $\mu m$, aspect ratio: 6) | 100 parts by weight |
| Binders: | |
| Polyvinyl chloride resin (Trade name: MR-110 manufactured by Nippon Zeon Co., Ltd.) | 16 parts by weight |
| Polyester-polyurethane resin (manufactured by Toyobo Co., Ltd.) | 4 parts by weight |
| Additives: | |
| Carbon | 2 parts by weight |
| $Al_2O_3$ | 5 parts by weight |
| Stearic acid | 1 part by weight |
| Heptyl stearate | 1 part by weight |
| Solvents: | |
| Methyl ethyl ketone | 150 parts by weight |
| Cyclohexanone | 150 parts by weight |

The below-mentioned composition was weighed and mixed together. Further, the mixture was intimately mixed in a kneader and then dispersed in a sand mill for 4 hours to form a lower layer coating material.

Composition of lower layer coating material:

| | |
|---|---|
| Non-magnetic powder: | 100 parts by weight |
| Acicular $\alpha$-$Fe_2O_3$ (longer axis length: 0.15 $\mu m$, aspect ratio: | 89.9 parts by weight |
| Carbon black (average particle size: 0.025 $\mu m$) (A volume ratio of the acicular $\alpha$-$Fe_2O_3$ to carbon black is 80:20.) | 10.1 parts by weight |
| Binders: | |
| Polyvinyl chloride resin (Trade name: MR-110 manufactured by Nippon Zeon Co., Ltd.) | 13 parts by weight |
| Polyester-polyurethane resin (manufactured by Toyobo Co., Ltd.) | 4 parts by weight |
| Additives: | |
| Stearic acid | 1 part by weight |
| Heptyl stearate | 1 part by weight |
| Solvents: | |
| Methyl ethyl ketone | 105 parts by weight |
| Cyclohexanone | 105 parts by weight |

Polyisocyanate was added to the thus-prepared upper layer coating material in an amount of 4 parts by weight and to the thus-prepared lower layer coating material in an amount of 2 parts by weight. The upper and lower layer coating materials were coated on a PET (polyethylene terephthalate) film having a thickness of 7 μm by using a four lip-type die coater. The coating materials coated on the film are subjected to an orientation treatment by using a solenoid coil. Thereafter, The coating materials were dried and then in turn subjected to a calendar treatment and a curing treatment to form an upper layer having a thickness of 0.3 μm and a lower layer having a thickness of 2.4 μm.

Next, a back layer coating material was prepared from the below-mentioned composition.

Composition of back layer coating material:

| | |
|---|---|
| Carbon black (#50 manufactured by Asahi kasei Co., Ltd.) | 100 parts by weight |
| Polyester-polyurethane (Trade name N-2304 manufactured by Nipporan Co., Ltd.) | 100 parts by weight |
| Solvents: | |
| Methyl ethyl ketone | 500 parts by weight |
| Toluene | 500 parts by weight |

The thus-prepared back layer coating material was coated on a surface of the PET film opposite to the side where the afore-mentioned lower and upper layers were formed, and then dried to from a back coating layer.

The PET film on which the afore-mentioned lower, upper and back coating layers were formed, was slit into a magnetic tape having a width of 8 mm.

Examples 2 and 3

Example 1 was repeated in the same manner as described above to prepare a magnetic tape, except that α-$Fe_2O_3$ having such configurations as shown in Table 1 was used as the non-magnetic powder to be contained in the lower coating layer.

Comparative Examples 1 and 2

Example 1 was repeated in the same manner as described above to prepare a magnetic tape, except that α-$Fe_2O_3$ and carbon black having such configurations as shown in Table 1 were used as the non-magnetic powder to be contained in the lower coating layer.

Comparative Example 3

Example 1 was repeated in the same manner as described above to prepare a magnetic tape, except that the lower layer coating material was coated on the non-magnetic substrate by using a two lip-type die head provided with a single slit and then dried to form a lower layer, and the upper layer coating material was coated on the dried lower layer by using the same die head to form an upper layer (wet-on-dry coating method).

The magnetic tapes prepared above were measured for a surface roughness Ra of the upper layer and a reproduction output at 7 MHz.

Incidentally, the surface roughness Ra is a center line average surface roughness according to JIS B0601 and measured by an optical method.

The reproduction output was measured by using a fixed head-type measuring apparatus for measuring an electromagnetic transduction characteristic. The fixed head-type measuring apparatus includes a rotary drum and a head disposed in contact with the rotary drum. The magnetic tape to be measured was wound around and traveled along the rotary drum so as to be brought into slide contact with the head. By using the fixed head-type measuring apparatus, a rectangular wave signal of 7 MHz was first recorded on the respective magnetic tapes at an optimum recording current. Next, an output level of the recorded signal was measured by using a spectrum analyzer. Incidentally, the output levels are relative values obtained by comparing with an output level (0 dB) of a reference tape (8 mm Hi8 tape manufactured by Sony Corp.). The relative head to tape velocity was set to 3.33 m/s.

The results from the measurements of the surface roughness Ra and the reproduction output at 7 MHz are shown in Table 1 together with the conditions for forming the upper and lower layers.

TABLE 1

| Example No. | Exam. 1 | Exam. 2 | Exam. 3 | Com. Exam. 1* | Com. Exam. 2* | Com. Exam. 3* |
|---|---|---|---|---|---|---|
| Acicular α-$Fe_2O_3$ | | | | | | |
| Longer axis length | 0.15 | 0.1 | 0.08 | 0.3 | 0.3 | 0.15 |
| Aspect ratio | 6 | 5 | 4 | 12 | 12 | 6 |
| Amount added (part by weight) | 89.9 | 89.9 | 89.9 | 89.9 | 89.9 | 89.9 |
| Volume ratio (%) | 80 | 80 | 80 | 80 | 80 | 80 |
| Carbon black | | | | | | |
| Average particle size (μm) | 0.025 | 0.025 | 0.025 | 0.025 | 0.1 | 0.025 |
| Amount added (part by weight) | 10.1 | 10.1 | 10.1 | 10.1 | 10.1 | 10.1 |
| Volume ratio (%) | 20 | 20 | 20 | 20 | 20 | 20 |
| Thickness of upper layer (μm) | 0.3 | 0.3 | 0.3 | 0.3 | 0.3 | 0.3 |
| Thickness of lower layer (μm) | 2.4 | 2.4 | 2.4 | 2.4 | 2.4 | 2.4 |
| 7 MHz Reproduction output (dB) | 3.1 | 3.3 | 3.7 | 1.2 | 0.8 | — |
| Surface roughness (nm) | 4.2 | 4.1 | 3.9 | 6.7 | 8.2 | — |

Note: *Comparative Examples

As appreciated from Table 1, the magnetic tapes of Examples 1 to 3 exhibited a good surface property as compared with those of comparative Examples 1 and 2. Further, the reproduction outputs of Examples 1 to 3 were 3 dB or higher. On the other hand, the magnetic tapes of Comparative Examples 1 and 2, whose lower layers contained the acicular α-$Fe_2O_3$ having a longer axis length and an aspect ratio out of the given range, exhibited coarse surfaces and low reproduction outputs. Especially, this undesired tendency was remarkably recognized with respect to the magnetic tape of Comparative Example 2 containing carbon black whose average particle size was as large as 0.1 μm.

As the results of the above-mentioned studies, it is confirmed that, when the acicular inorganic powder contained in the lower layer has a longer axis length of 0.05 to 0.2 μm and an aspect ratio of 2 to 10, the surface property and the electromagnetic transduction characteristic are effectively improved.

Meanwhile, the magnetic tape of Comparative Example 3, whose upper and lower layers were produced according to the wet-on-dry coating method, exhibited a serious coating deficiency so that the surface roughness thereof could not be measured. This resulted in large spacing loss and unmeasurable reproduction output. Consequently, it is confirmed that the thin layers, especially the upper layer, each having a thickness as thin as about 0.3 μm, are difficult to produce according to the wet-on-dry coating method.

Experimental Examples 1 to 6

Study on amount and average particle size of carbon black added

Example 1 was repeated in the same manner as described above to prepare magnetic tapes, except that α-Fe$_2$O$_3$ having a longer axis length of 0.15 μm and an aspect ratio of 6 was used as the non-magnetic powder and carbon black having an average particle size shown in Table 2 was added to the coating material in an amount also shown in Table 2. The thus-prepared magnetic tapes were measured for a surface roughness Ra of the upper layer and a reproduction output at 7 MHz. The results from the measurements of the surface roughness Ra and the reproduction output at 7 MHz are shown in Table 2 together with the conditions for forming the upper and lower layers.

TABLE 2

| Experimental Example No. | 1 | 2 | 3 | 4 | 5 | 6 |
|---|---|---|---|---|---|---|
| Acicular α-Fe$_2$O$_3$ | | | | | | |
| Longer axis length | 0.15 | 0.15 | 0.15 | 0.15 | 0.15 | 0.15 |
| Aspect ratio | 6 | 6 | 6 | 6 | 6 | 6 |
| Amount added (part by weight) | 76.9 | 83.8 | 89.9 | 95.2 | 89.9 | 89.9 |
| Volume ratio (%) | 60 | 70 | 80 | 90 | 80 | 80 |
| Carbon black | | | | | | |
| Average particle size (μm) | 0.025 | 0.025 | 0.025 | 0.025 | 0.04 | 0.1 |
| Amount added (part by weight) | 23.1 | 16.2 | 10.1 | 4.8 | 10.1 | 10.1 |
| Volume ratio (%) | 40 | 30 | 20 | 10 | 20 | 20 |
| Thickness of upper layer (μm) | 0.3 | 0.3 | 0.3 | 0.3 | 0.3 | 0.3 |
| Thickness of lower layer (μm) | 2.4 | 2.4 | 2.4 | 2.4 | 2.4 | 2.4 |
| 7 MHz Reproduction output (dB) | 1.8 | 3.2 | 3.1 | 3.5 | 2.9 | 1.0 |
| Surface roughness (nm) | 5.8 | 4 | 4.2 | 3.7 | 4.5 | 6.5 |

As appreciated from Table 2, the comparison between the magnetic tapes of Experimental Examples 1 to 6, revealed that the magnetic tapes of Experimental Examples 2 to 4, whose volume ratio of carbon black is 30% or lower, exhibited a reproduction output of 3 dB or higher. On the other hand, the magnetic tapes of Experimental Example 1, whose volume ratio of carbon black is 40% or higher, exhibited a reproduction output as low as 1.8 dB.

Further, the comparison between Experimental Example 3 and Experimental Examples 5 and 6, to which is added the carbon black having a different average particle sizes from that of Experimental Example 3, revealed that the magnetic tapes of Experimental Examples 3 and 5 whose carbon black had an average particle size of 0.04 μm or smaller, exhibited a sufficient reproduction output as high as about 3 dB, while the magnetic tape of Experimental Example 6, to which is added the carbon black having an average particle size as large as 0.1 μm, exhibited a reproduction output as low as 1 dB.

Accordingly, in the case carbon black is added to the coating material, the average particle size and the content thereof is suitably adjusted to an optimum range. That is, it is preferred that the average particle size of carbon black added is in the range of 0.01 μm to 0.04 μm and the volume ratio of the acicular α-Fe$_2$O$_3$ to carbon black is in the range of 70:30 to 100:0.

What is claimed is:

1. A magnetic recording medium comprising:
    a non-magnetic substrate;
    a lower layer disposed on top of the non-magnetic substrate, the lower layer comprising a resin, an acicular iron oxide powder and carbon black in a volumetric ratio of acicular iron oxide powder to carbon black ranging from about 90:10 to about 70:30, the acicular iron oxide is not coated with a compound or coupling agent prior to mixing with the resin and carbon black, the acicular iron oxide powder further being characterized as having longer axis length ranging from 0.08 to 0.15 μm and an aspect ratio ranging from 4 to 6, the carbon black further being characterized as having a particle size ranging from 0.01 to 0.04 μm;
    an upper layer disposed on top of the lower layer, the upper layer comprising a ferromagnetic powder and a binder, the upper layer further being characterized as having a thickness ranging from 0.1 to 0.5 μm.
2. The magnetic recording medium of claim 1 wherein the volumetric ratio of acicular iron oxide power to carbon black is about 80:20.
3. The magnetic recording medium of claim 1 wherein the aspect ratio of the acicular iron oxide power is about 6.
4. The magnetic recording medium of claim 1 wherein the particle size of the carbon black is about 0.025 μm.
5. The magnetic recording medium of claim 1 wherein the longer axis length of the acicular iron oxide is about 0.15 μm.
6. The magnetic recording medium of claim 1 wherein the lower layer has a thickness of about 2.4 μm.
7. A magnetic recording medium comprising:
    a non-magnetic substrate;
    a lower layer disposed on top of the non-magnetic substrate, the lower layer comprising an acicular iron oxide powder and carbon black in a volumetric ratio of acicular iron oxide powder to carbon black being about 80:20, the acicular iron oxide powder further being characterized as having longer axis length of about 0.15 μm and an aspect ratio of about 6, the carbon black further being characterized as having a particle size of about 0.025 μm, the lower layer further having a thickness of about 2.4 μm;
    an upper layer disposed on top of the lower layer, the upper layer comprising a ferromagnetic powder and a binder, the upper layer further being characterized as having a thickness of about 0.3 μm.
8. A magnetic recording medium comprising:
    a non-magnetic substrate;
    a lower layer disposed on top of the non-magnetic substrate, the lower layer comprising a resin, an acicular iron oxide powder and carbon black in a volumetric ratio of acicular iron oxide powder to carbon black being about 80:20, the acicular iron oxide is not coated with a compound or coupling agent prior to mixing with the resin and carbon black, the acicular iron oxide powder further being characterized as having longer axis length of about 0.15 $\mu$m and an aspect ratio ranging from 4 to 6, the carbon black further being characterized as having a particle size of about 0.025 $\mu$m, the lower layer further having a thickness of about 2.4 $\mu$m;

an upper layer disposed on top of the lower layer, the upper layer comprising a ferromagnetic powder and a binder, the upper layer further being characterized as having a thickness of less than 0.5 $\mu$m.

* * * * *